US012404722B2

(12) United States Patent
Faizan et al.

(10) Patent No.: US 12,404,722 B2
(45) Date of Patent: Sep. 2, 2025

(54) METHOD AND SYSTEM FOR PROVIDING A SMART LADDER TO A USER

(71) Applicant: Mirza Faizan, Irving, TX (US)

(72) Inventors: Mirza Faizan, Irving, TX (US); Shayaan Shaik, Edison, NJ (US); Aqil Gudur, Edison, NJ (US); Zashaan T Shaik, Edison, NJ (US); Gupil Mayari, Irving, TX (US); Omar Mohammed, Durham, NC (US); Suleman Khan Mohammed, Durham, NC (US); Mirza Rizwan, Patna (IN); Humna Fakeha Khan, Rampur (IN); Zaynab Khan, Murphy, TX (US); Mishaal Qureshi, Frisco, TX (US); Abdullah Hasani, Murphy, TX (US)

( * ) Notice: Subject to any disclaimer, the term of this patent is extended or adjusted under 35 U.S.C. 154(b) by 765 days.

(21) Appl. No.: 17/720,606

(22) Filed: Apr. 14, 2022

(65) Prior Publication Data

US 2023/0332468 A1 Oct. 19, 2023

(51) Int. Cl.
*E06C 7/18* (2006.01)

(52) U.S. Cl.
CPC .................................... *E06C 7/18* (2013.01)

(58) Field of Classification Search
CPC .................................. E06C 7/18; E06C 7/185
See application file for complete search history.

(56) References Cited

U.S. PATENT DOCUMENTS

| | | | | | |
|---|---|---|---|---|---|
| 2,535,544 | A * | 12/1950 | Mckinley | E06C 7/006 | 182/113 |
| 3,038,555 | A * | 6/1962 | Da Lee | E06C 7/18 | 182/83 |
| 4,524,848 | A * | 6/1985 | Russo | E06C 7/185 | 182/92 |
| 4,664,225 | A * | 5/1987 | Coutier | E06C 7/185 | 182/116 |
| 6,607,053 | B1 * | 8/2003 | Warren | E06C 9/02 | 182/106 |
| 7,137,478 | B2 * | 11/2006 | Becker | E06C 7/185 | 182/230 |
| 7,584,823 | B2 * | 9/2009 | Guering | B64D 11/00 | 244/1 R |
| 8,430,205 | B2 * | 4/2013 | Leung | E04H 4/144 | 182/180.1 |

(Continued)

FOREIGN PATENT DOCUMENTS

| | | | |
|---|---|---|---|
| DE | 2306854 | A1 * | 9/1973 |
| FR | 2163210 | A5 * | 7/1973 |

(Continued)

*Primary Examiner* — Stanton L Krycinski

(57) ABSTRACT

A method for self-rescuing a user climbing a smart ladder is provided. The method includes activating, by a processor, a mesh unit based on a detection of the user's step above a certain height from a pedalboard of the smart ladder. The mesh unit is installed along at least one side of the smart ladder. The mesh unit is extended outwardly like a folding hand fan to form a secured circular net mesh configuration along the sides of the smart ladder. Further, the method includes suspending, by the processor, the mesh unit, based on a detection of the user's step at the pedalboard. Furthermore, the method includes folding, by the processor, the mesh unit back along at least one side of the smart ladder.

2 Claims, 3 Drawing Sheets

(56) References Cited

U.S. PATENT DOCUMENTS

| | | | | |
|---|---|---|---|---|
| 10,260,282 | B1 * | 4/2019 | Bautista | G01L 1/005 |
| 11,091,957 | B2 * | 8/2021 | Voss | E06C 7/08 |
| 11,519,224 | B2 * | 12/2022 | Wells | E04G 7/34 |
| 11,692,395 | B1 * | 7/2023 | Bullock | E06C 1/06 182/129 |
| 2006/0032704 | A1 * | 2/2006 | Chandra | E06C 7/18 182/18 |
| 2007/0151801 | A1 * | 7/2007 | Talley | E06C 7/185 182/106 |
| 2014/0144006 | A1 * | 5/2014 | Ashouri | E06C 7/185 29/525.08 |
| 2023/0351538 | A1 * | 11/2023 | Sakai | A61B 5/1121 |

FOREIGN PATENT DOCUMENTS

| | | | | | |
|---|---|---|---|---|---|
| FR | 2342387 | A1 | * | 9/1977 | |
| FR | 2636360 | A1 | * | 3/1990 | |
| FR | 2799501 | A1 | * | 4/2001 | E06C 7/006 |
| FR | 2824592 | A1 | * | 11/2002 | E06C 7/14 |
| JP | 2001098866 | A | * | 4/2001 | E06C 7/185 |
| KR | 200420856 | Y1 | * | 7/2006 | |
| KR | 20040070860 | A | * | 7/2006 | |
| KR | 200426543 | Y1 | * | 9/2006 | |
| KR | 100736330 | B1 | * | 7/2007 | |
| KR | 100736331 | B1 | * | 7/2007 | |
| KR | 20080070895 | A | * | 8/2008 | |
| KR | 20090004795 | U | * | 5/2009 | |
| KR | 101166116 | B1 | * | 7/2012 | |
| KR | 101175832 | B1 | * | 8/2012 | |
| WO | WO-2020047616 | A1 | * | 9/2020 | |

* cited by examiner

METHOD AND SYSTEM FOR PROVIDING A SMART LADDER TO A USER

TECHNICAL FIELD

The present invention generally relates to the field of electronic devices and electronic safety systems for ladders and more particularly to a method and system for providing a smart ladder to a user with the ability to provide a protection system and prevent life-threatening accidents.

BACKGROUND OF THE INVENTION

As is generally known in today's world, the use of ladders is well known and used for a long time. However, using a ladder always comes with the risk of life-threatening situations like fracture, head injury, spine injury, etc. Ladders always involve the risk of serious injuries due to the unstable and unpredictable nature of the build. With the evolving times, it is required to make the use of ladders hazard-free and as safe as possible. There is a need for a system that can predict and perform smart safety functions to protect the user in situations of danger and hazard.

There is also a need to prepare a system for the safety equipped ladders and systems related thereto for the ability of the safe ladder system to perform safety functions based on the preset levels of safety and predict and understand the behavior of the user.

Thus, in view of above mentioned risk involved in usage of conventional ladder, there is a need of a smart and safe ladder system that protects the user and is economical and easy to use with reliable and accessible features ensuring to protect the user in any scenario of an accident by studying and understanding the actions of the user. In conclusion, there is a need for a smart safe ladder system wherein the system and its components are economical and simple in manufacture and use.

Further limitations and disadvantages of conventional and traditional approaches will become apparent to one of skill in the art, through comparison of described systems with some aspects of the present disclosure, as set forth in the remainder of the present application and with reference to the drawings.

SUMMARY OF THE INVENTION

The foregoing summary is illustrative only and is not intended to be in any way limiting. In addition to the illustrative aspects, embodiments, and features described above, further aspects, embodiments, and features will become apparent by reference to the drawings and the following detailed description.

According to embodiments illustrated herein, the present invention discloses a method and system for providing a smart ladder system. The present invention aims at providing a ladder safety system capable of performing safety-related functions in the interest of the user and preventing dangerous accidents which may lead to life-threatening injuries affecting the livelihood of a person. In an example, the ladder system comprises a ladder equipped with a safety net or a trampoline capable of protecting a user. The ladder opening or folding the safety net is based on the behavior of the user and the height he has climbed to. The system is capable of receiving instructions and being controlled by the user while comprising accessible features making the device simple to use, manufacture, and economical in nature.

According to embodiments illustrated herein, there may be provided a method for self-rescuing a user climbing a smart ladder. The method includes activating, by a processor, a mesh unit based on a detection of the user's step above a certain height from a pedalboard of the smart ladder. The mesh unit is installed along at least one side of the smart ladder. The mesh unit is extended outwardly like a folding hand fan to form a secured circular net mesh configuration along the sides of the smart ladder. Further, the method includes suspending, by the processor, the mesh unit, based on a detection of the user's step at the pedalboard. Furthermore, the method includes folding, by the processor, the mesh unit back along at least one side of the smart ladder.

According to embodiments illustrated herein, there may be provided a system for self-rescuing a user climbing a smart ladder. The system includes a processor to activate a mesh unit based on a detection of the user's step above a certain height from a pedalboard of the smart ladder. The mesh unit is installed along at least one side of the smart ladder, wherein the mesh unit is extended outwardly like a folding hand fan to form a secured circular net mesh configuration along the sides of the smart ladder. Further, the system includes the processor to suspend the mesh unit, based on a detection of the user's step at the pedalboard. Furthermore, the system includes the processor to fold the mesh unit back along at least one side of the smart ladder.

BRIEF DESCRIPTION OF THE DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

Figure 1:
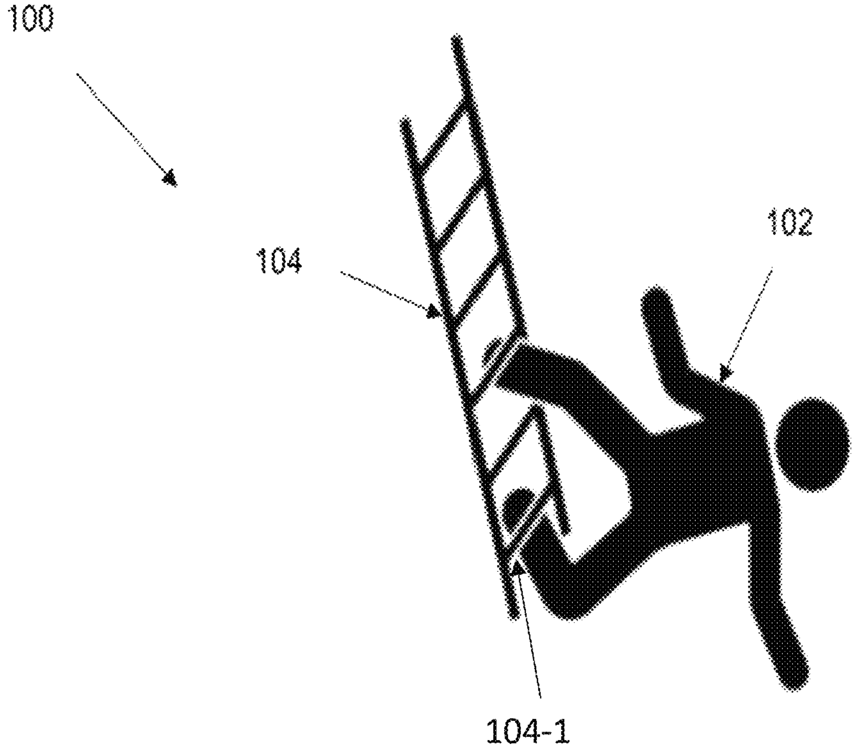
FIG. 1 is an exemplary network environment diagram 100 that illustrates a smart ladder, in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in a computer-readable medium and executed by a computer or processor, whether or not such computer or processor is explicitly shown.

DETAILED DESCRIPTION

The present disclosure may be best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternative and suitable approaches to implement the functionality of any detail described herein. Therefore, any approach may extend beyond the particular implementation choices in the following embodiments described and shown.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

As used herein, the following terms have the following meanings:

"A", "an", and "the" as used herein refers to both singular and plural referents unless the context clearly dictates otherwise. By way of example, "a compartment" refers to one or more than one compartment.

"About" as used herein referring to a measurable value such as a parameter, an amount, a temporal duration, and the like, is meant to encompass variations of +/−20% or less, preferably +/−10% or less, more preferably +/−5% or less, even more preferably +/−1% or less, and still more preferably +/−0.1% or less of and from the specified value, in so far such variations are appropriate to perform in the disclosed invention. However, it is to be understood that the value to which the modifier "about" refers is itself also specifically disclosed.

"Comprise", "comprising", and "comprises" and "comprised of" as used herein are synonymous with "include", "including", "includes" or "contain", "containing", "contains" and are inclusive or open-ended terms that specifies the presence of what follows e.g. component and do not exclude or preclude the presence of additional, non-recited components, features, element, members, steps, known in the art or disclosed therein.

Furthermore, the terms first, second, third and the like in the description and in the claims, are used for distinguishing between similar elements and not necessarily for describing a sequential or chronological order, unless specified. It is to be understood that the terms so used are interchangeable under appropriate circumstances and that the embodiments of the invention described herein are capable of operation in other sequences than described or illustrated herein.

The recitation of numerical ranges by endpoints includes all numbers and fractions subsumed within that range, as well as the recited endpoints. The expression "% by weight", "weight percent", "% wt" or "wt %", here and throughout the description unless otherwise defined, refers to the relative weight of the respective component based on the overall weight of the formulation.

Whereas the terms "one or more" or "at least one", such as one or more or at least one member(s) of a group of members, is clear per se, by means of further exemplification, the term encompasses inter alia a reference to any one of said members, or to any two or more of said members, such as, e.g., any ≥3, ≥4, ≥5, ≥6 or ≥7 etc. of said members, and up to all said members.

Unless otherwise defined, all terms used in disclosing the invention, including technical and scientific terms, have the meaning as commonly understood by one of ordinary skill in the art to which this invention belongs. By means of further guidance, definitions for the terms used in the description are included to better appreciate the teaching of the present invention. The terms or definitions used herein are provided solely to aid in the understanding of the invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures, or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention and form different embodiments, as would be understood by those in the art. For example, in the following claims, any of the claimed embodiments may be used in any combination.

It is desirable to have a new system and method that solves the above challenges as well as helps the users with a cost-effective, reliable, and efficient way of managing the day-to-day work. The present device is capable of understanding specific inputs and gestures from the user enabling the user to be safe from any accident that may arise due to falling from the ladder. The present device also aids in providing easy and accessible input to the processing unit based on the user's inputs without hindering and causing problems. Another feature is the moment anyone crosses the second step of the ladder, the system gets activated and spreads a catching net or trampoline with the help of movable arm frames. The system folds itself when anyone climbs down to the second step on the smart ladder.

Definitions: The following terms shall have, for the purposes of this application, the respective meanings set forth below. The glossary of terms described below relates to the conceptual, architectural, and functional elements within the scope of work on delivering cash to a user.

The mobile device may refer to a computing device such as a computer, a device including a processor/microcontroller, and/or any other electronic component, device, or system that performs one or more operations according to one or more programming instructions. Examples of a mobile device include but are not limited to, a desktop computer, a laptop, a personal digital assistant (PDA), a Smartphone, or the like. The mobile device is capable of accessing (or being accessed over) a network (e.g., using wired or wireless communication capabilities).

Mobile application refers to applications that can be instantiated on a mobile device. A mobile application, most commonly referred to as an app, is a type of application software designed to run on a mobile device, such as a smartphone or tablet computer. Mobile applications frequently serve to provide users with similar services to those accessed on PCs. Apps are generally small, individual software units with limited function.

FIG. 1 is an environment 100 that illustrates climbing of a user 102 on a ladder 104. The environment includes the ladder 104 and the user 102. The user 102 in climbing on the ladder 104. Further, due to any unfortunate event, the user 102 may fall from the ladder 104. However, using a ladder always comes with the risk of life-threatening situations like fracture, head injury, spine injury, etc. Ladders always involve the risk of serious injuries due to the unstable and unpredictable nature of the build. With the evolving times, it is required to make the use of ladders hazard-free and as safe as possible. There is a need for a system that can predict and perform smart safety functions to protect the user in situations of danger and hazard.

There is also a need to prepare a system for the safety equipped ladders and systems related thereto for the ability of the safe ladder system to perform safety functions based on the preset levels of safety and predict and understand the behavior of the user.

Figure 2:
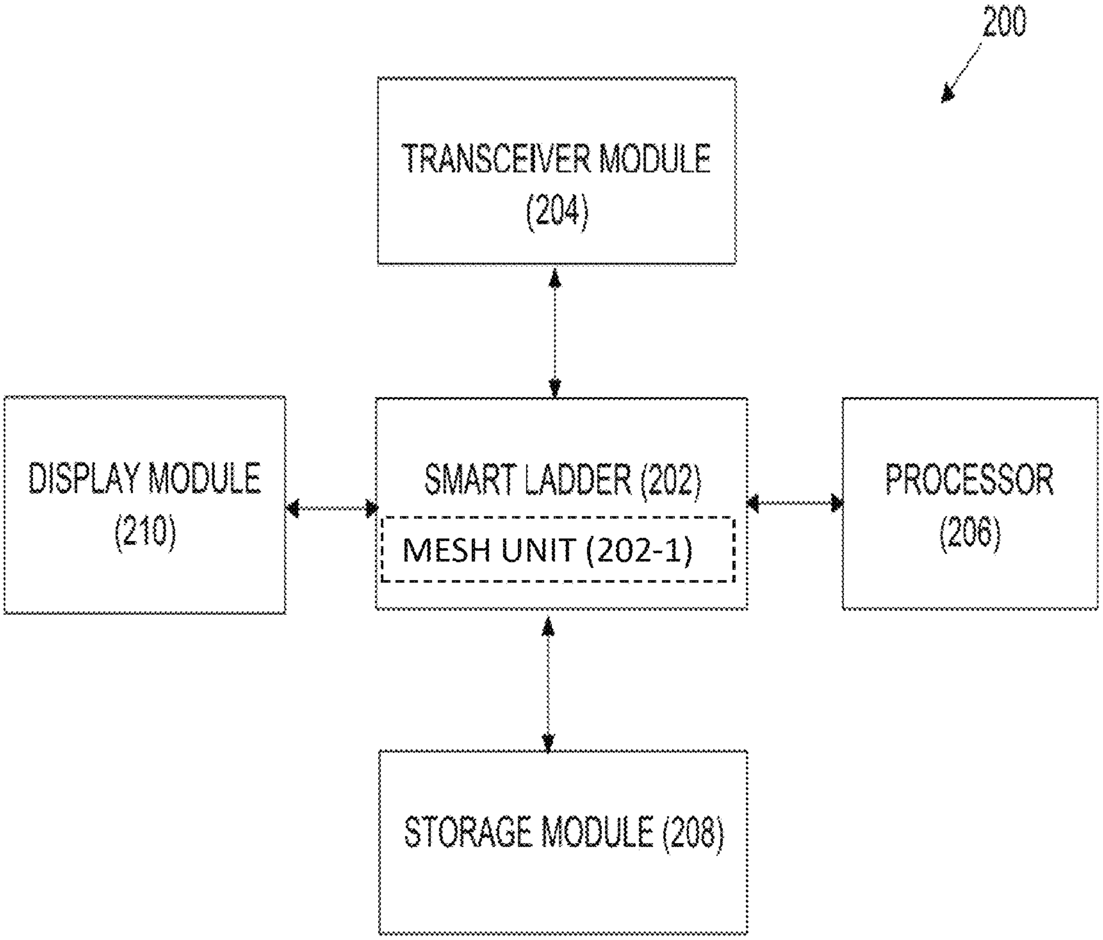
FIG. 2 is a block diagram 200 that illustrates a smart ladder, in accordance with some embodiments of the present disclosure.

FIG. 2 is a diagram that illustrates a block diagram 200 for a smart ladder, in accordance with some embodiments of the present disclosure. The system 200 may include a smart ladder 202, a receiver 204, a processor 206, a memory 208, and a display unit 210. The smart ladder 202 may be communicatively coupled to the receiver 204, and the processor 208 via the smart ladder 202.

The processor 206 comprises suitable logic, circuitry, interfaces, and/or code that is configured to execute a set of instructions stored in the memory 208. The processor 206 is implemented based on one or more of a number of processor technologies known in the art. Examples of the processor 206 include one of an X86-based processor, a Reduced Instruction Set Computing (RISC) processor, an Application-Specific Integrated Circuit (ASIC) processor, a Complex Instruction Set Computing (CISC) processor, and/or other processors.

Memory 208 comprises suitable logic, circuitry, interfaces, and/or code that may be configured to store the set of instructions, which may be executed by the processor 206. In an embodiment, the memory 208 may be configured to store one or more programs, routines, or scripts that may be executed in coordination with the processor 206. The memory 208 may be implemented based on a Random Access Memory (RAM), a Read-Only Memory (ROM), a Hard Disk Drive (HDD), a storage server, and/or a Secure Digital (SD) card.

The transceiver 204 comprises suitable logic, circuitry, interfaces, and/or code that may be configured to receive an input from a user to connect the smart ladder 202 with the mesh unit 202-1 so that the mesh unit 202-1 is activated as soon as the user crosses the second step of the smart ladder 202.

The transceiver 204 may implement one or more known technologies to support wired or wireless communication with the communication network. In an embodiment, the transceiver 204 may include, but is not limited to, an antenna, a radio frequency (RF) transceiver, or the like. The transceiver 204 may communicate via wireless communication with networks, such as the Internet, an Intranet and/or a wireless network, such as a cellular telephone network, a wireless local area network (LAN), and/or a metropolitan area network (MAN).

In an embodiment of the present disclosure, a system 200 for self-rescuing a user climbing a smart ladder 202 is disclosed. The system includes a processor 206 to activate a mesh unit 202-1 based on a detection of the user's step above a certain height from a pedalboard 104-1 of the smart ladder. The mesh unit 202-1 is installed along at least one side of the smart ladder. Further, the mesh unit 202-1 is extended outwardly like a folding hand fan to form a secured circular net mesh configuration along the sides of the smart ladder. Further, the processor 206 is configured to suspend the mesh unit 202-1 based on a detection of the user's step at the pedalboard 104-1 of the smart ladder. Also, the processor 206 is configured to fold the mesh unit 202-1 back along at least one side of the smart ladder 202.

In yet another embodiment of the present disclosure, the system comprises the processor 206 to activate the mesh unit when the user crosses at least the second step of the smart ladder 202. Further, the system is configured to spread a catching net or trampoline with the help of movable arm frames and form the large circular trampoline net around the ladder. Also, the system is configured to fold the mesh unit itself when the user climbs down to the second step on the smart ladder 202. The system further provides a dedicated swing angle to provide lateral stability to the mesh unit in the folded and the unfolded position.

The present invention also includes a storage module 208. The storage module 208 is coupled to the smart ladder 202 and is configured to store the data. In an example embodiment, the present system may be used by a group of laborers in order to complete their day-to-day work. In this case, the laborers are not required to worry about their safety at all. The present disclosure allows the mesh unit to extend outwardly like a folding hand fan to form a secured circular net mesh configuration along the sides of the smart ladder.

Figure 3:
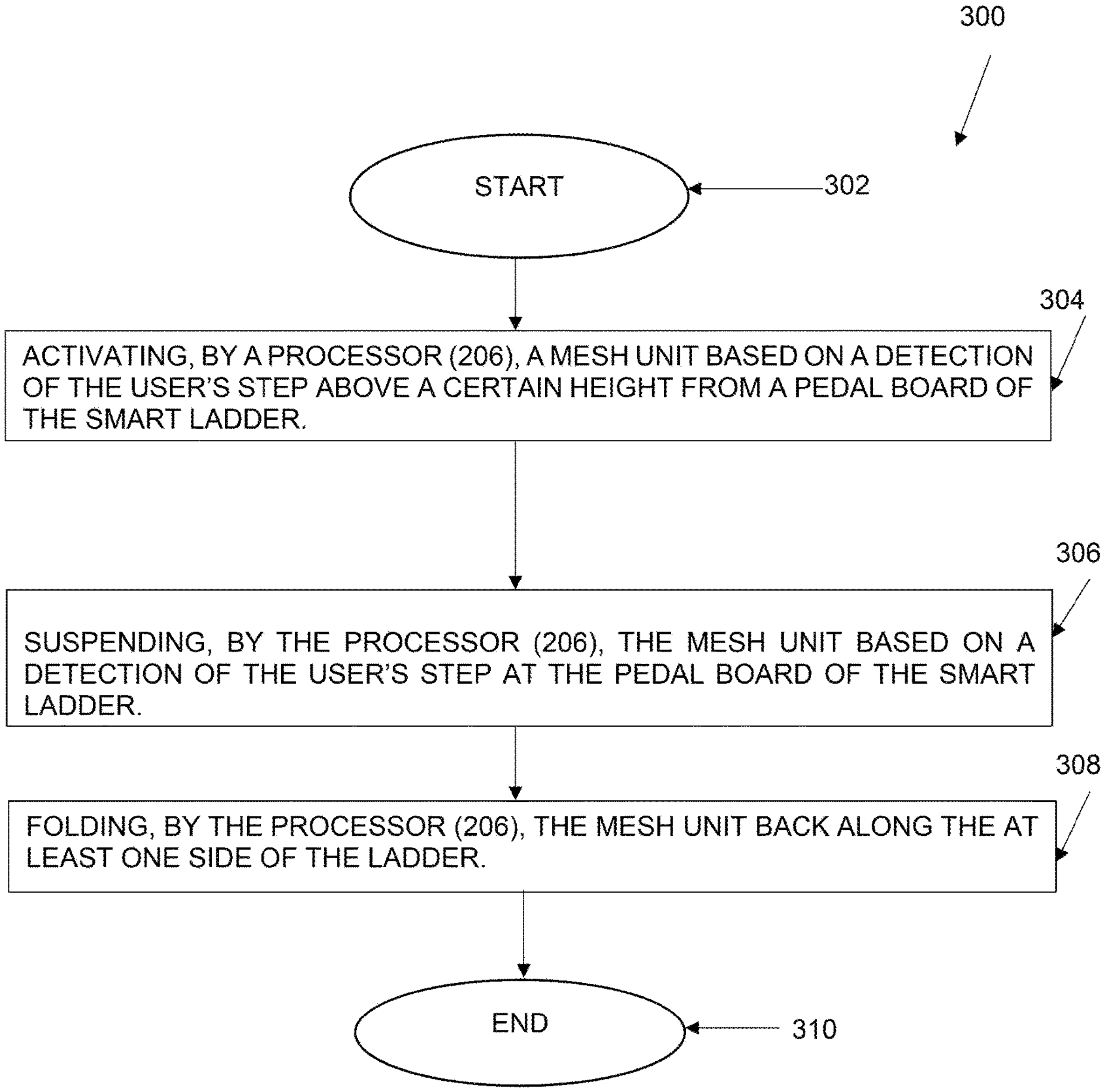
FIG. 3 is a flow diagram 300 that illustrates a smart ladder, in accordance with some embodiments of the present disclosure.

FIG. 3 is a flow diagram 300 that illustrates a smart ladder, in accordance with some embodiments of the present disclosure. The smart ladder comprises a processor, a memory, a transceiver, and an input/output unit. The processor may be communicatively coupled to the memory, the transceiver, and the input/output unit.

In an embodiment of the present disclosure, a method 300 for self-rescuing a user climbing a smart ladder is provided. The method begins at step 302. At step 304, the method includes activating, by a processor, a mesh unit 202-1 based on a detection of the user's step above a certain height from a pedalboard 104-1 of the smart ladder. The mesh unit 202-1 is installed along at least one side of the smart ladder. Further, the mesh unit 202-1 is extended outwardly like a folding hand fan to form a secured circular net mesh configuration along the sides of the smart ladder.

At step 306, the method also includes suspending, by the processor 206, the mesh unit 202-1 based on the detection of the user's step at the pedalboard 104-1 of the smart ladder. At step 308, the method includes folding, by the processor 206, the mesh unit 202-1 back along at least one side of the smart ladder. The method finally terminates at step 310.

In yet another embodiment of the present disclosure, the method also includes activating, by the processor 206, the mesh unit when the user crosses at least the second step of the smart ladder 202. Further, the method includes spreading at lest one of a catching net or trampoline with the help of movable arm frames and forming, by the processor 206, a large circular trampoline net around the smart ladder. Also, the method includes folding the mesh unit when the user climbs down to the second step on the smart ladder 202. Further, a dedicated swing angle to provide lateral stability to the mesh unit in the folded and the unfolded position.

In an example embodiment, one aspect of the present disclosure may be useful for recreational purposes and commercial purposes as well. For example, the laborer while working near the construction sites can make use of the present system. The system activates the mesh unit automatically and thus, the laborer is safe from any accident that may happen. This removes the need of using a manual mesh unit to protect the laborers. Further, the present invention may store the data in the storing unit as well for future purposes.

In yet another example embodiment, the user can grip the ladder from the sides by hand when climbing the platform ladder and can easily climb the platform ladder. Also, the safety net can prevent a tool from dropping and the fence of the ladder may be used to fix the safety net and can prevent the user from falling. In addition, the net support of the present invention is such that the end portion of the circular net has the same diameter as that of the conventional scaffolding pipe structure. Further, the mesh unit can be installed in the frame either fixed or suspended during the installation of the mesh unit.

In yet another example embodiment, the present invention may be used by an individual in their homes as well for their personal work. Therefore, the present system becomes very reliable and easy to use. There may be any number of user computers and any number of server computers. Users of computers described herein, for example, maybe interact with the disclosed systems. These computers may be operated by these users.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, non-volatile memory, hard drives, Compact Disc (CD) ROMs, Digital Video Disc (DVDs), flash drives, disks, and any other known physical storage media.

In light of the above-mentioned advantages and the technical advancements provided by the disclosed method and system, the claimed steps as discussed above are not routine, conventional, or well understood in the art, as the claimed steps enable the following solutions to the existing problems in conventional technologies. Further, the claimed steps clearly bring an improvement in the functioning of the device itself as the claimed steps provide a technical solution to a technical problem.

A description of an embodiment with several components in communication with each other does not imply that all such components are required. On the contrary, a variety of optional components are described to illustrate the wide variety of possible embodiments of the invention.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The present disclosure may be realized in hardware or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

A person with ordinary skills in the art will appreciate that the systems, modules, and sub-modules have been illustrated and explained to serve as examples and should not be considered limiting in any manner. It will be further appreciated that the variants of the above-disclosed system elements, modules, and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules, and are not limited to any particular computer hardware, software, middleware, firmware, microcode, and the like. The claims can encompass embodiments for hardware and software, or a combination thereof.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A method for self-rescuing a user climbing a smart ladder, the method comprising:

activating, by a processor, a mesh unit based on detecting that a step of the user crosses a second step of the smart ladder and ascends towards a third or higher step of the smart ladder, wherein the mesh unit is installed along at least one side of the smart ladder, and wherein the mesh unit includes movable arm frames and a catching net spreadable to form a secured circular net mesh configuration around the smart ladder;

spreading, by the processor, the catching net via the movable arm frames to form the secured circular net mesh configuration around the smart ladder, mesh unit based on the activation of the mesh unit; and folding, by the processor, the catching net via the movable arm frames along the at least one side of the smart ladder, based on detecting that the step of the user descends from the second step towards a first step of the smart ladder.

2. A system for self-rescuing a user climbing a smart ladder, the system comprising:

a processor configured to:

activate a mesh unit based on a detection that a step of the user crosses a second step of the smart ladder and ascends towards a third or higher step of the smart ladder, wherein the mesh unit is installed along at least one side of the smart ladder, and wherein the mesh unit includes movable arm frames and a catching net spreadable to form a secured circular net mesh configuration around-along the sides of the smart ladder;

spread the catching net via the movable arm frames to form the secured circular net mesh configuration around the smart ladder, based on the activation of the mesh unit; and fold the catching net via the movable arm frames along the at least one side of the smart ladder, based on a detection that the step of the user descends from the second step towards a first step of the smart ladder.

* * * * *